(No Model.) 2 Sheets—Sheet 1.

J. C. BAYLES.
FLUX CARRIER.

No. 405,866. Patented June 25, 1889.

Attest:
L. Lee.
F. C. Fischer

Inventor.
James C. Bayles, per
Crane & Miller, Attys.

(No Model.) 2 Sheets—Sheet 2.

J. C. BAYLES.
FLUX CARRIER.

No. 405,866. Patented June 25, 1889.

Attest:
L. Lee.
F. C. Fischer

Inventor.
James C. Bayles, per
Crane & Miller, Attys

UNITED STATES PATENT OFFICE.

JAMES C. BAYLES, OF EAST ORANGE, NEW JERSEY.

FLUX-CARRIER.

SPECIFICATION forming part of Letters Patent No. 405,866, dated June 25, 1889.

Application filed May 22, 1889. Serial No. 311,689. (No model.)

*To all whom it may concern:*

Be it known that I, JAMES C. BAYLES, a citizen of the United States, residing at East Orange, Essex county, New Jersey, have invented certain new and useful Improvements in Flux-Carriers, fully described and represented in the following specification and the accompanying drawings, forming a part of the same.

The object of this invention is to furnish a means of conveying a flux accurately to any particular part of a welded joint, and the invention is especially applicable for the application of flux to joints where a powerful blast is employed, and especially to a continuous welded seam, in which the flux may be continuously applied at the same point immediately beneath the hammer.

The improvement consists in combining the fluxing material with a suitable fibrous substance, preferably of iron gauze, adapted to amalgamate with the metal to be welded. By combining the flux with a fibrous material the particles of the flux are held together in a convenient form and are prevented from dispersion by the blast employed or the jar caused by the blows of the welding-hammer. Any suitable fibrous material woven into cloth or otherwise prepared for the purpose may be combined with the flux and the flux may be incorporated therewith by melting the flux and dipping the fibrous substance therein, or by incorporating the powder with the fibrous material by the aid of suitable adhesive substances. Fine wire in the form of cloth, net, or gauze offers the most suitable fibers for retaining the flux, as it may be readily bent to any desired form to fit the welded joint, and is thus adapted to retain its position during the welding operation.

Figure 1:
Figure 2:
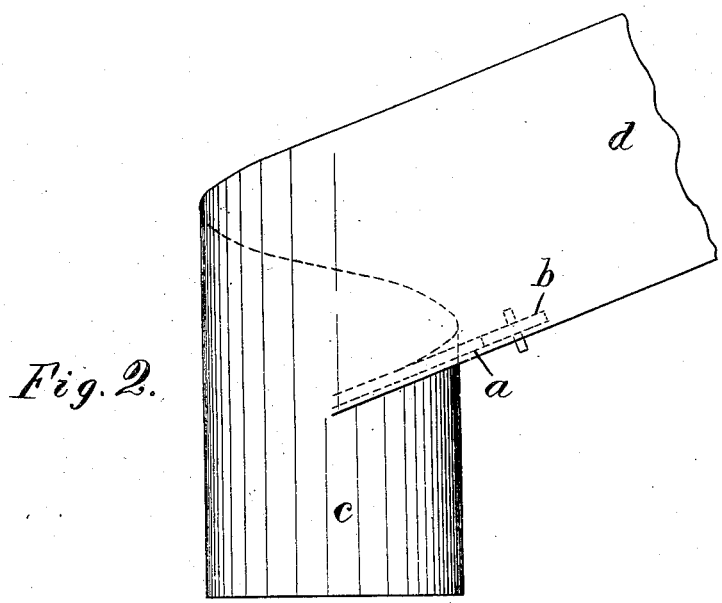
Figure 3:
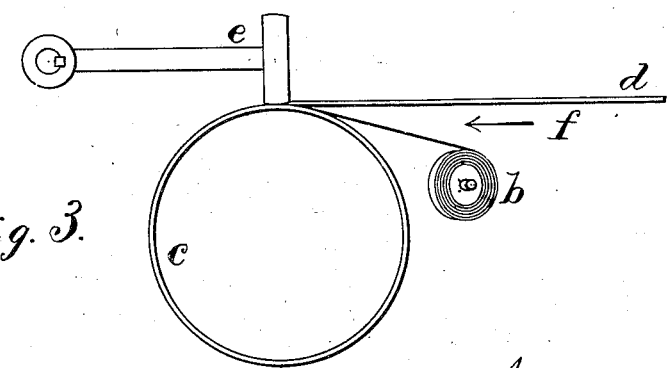
Figure 4:
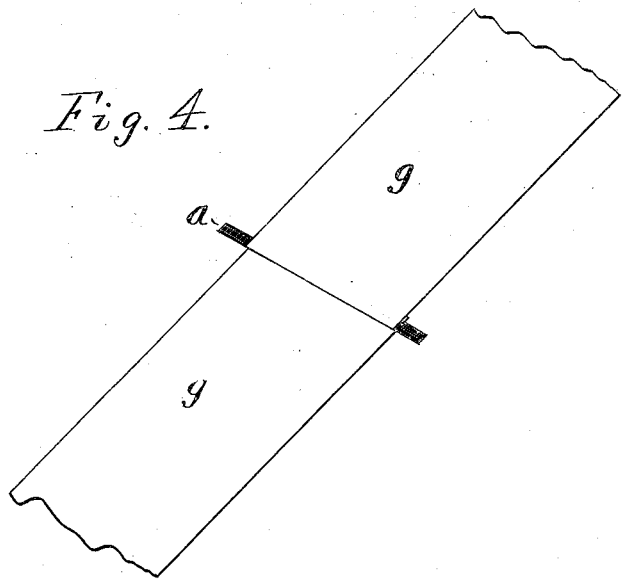
Figure 5:
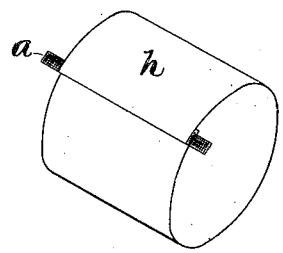

The invention is shown in the annexed drawings applied to the fluxing of a spiral seam upon a spirally-welded sheet-metal pipe, Figure 1 of the drawings showing a strip of wire-gauze adapted to serve as a carrier or vehicle for the fluxing substance. Fig. 2 represents in plan a portion of a pipe with skelp applied spirally thereto for welding the same thereto with a spiral seam. Fig. 3 is an end view of the pipe, representing the skelp tangential thereto, with a hammer for closing the seam, and a roll of the flux-carrier with one end of the strip inserted in the joint to be welded. Figs. 4 and 5, are other applications of the flux-carrier.

The wire-gauze $a$ (shown in Fig. 1) is made a vehicle for the flux by dipping it in melted borax, coating it with some sticky substance, and pressing the flux in powder thereon, or otherwise filling its pores with the fluxing material. The wire-gauze thus prepared may be cut into pieces of suitable size and laid or held in the joint to be welded, or a ribbon of the gauze may, as shown in Fig. 4 of the drawings, be mounted adjacent to the welded seam, where the welded seam is of a continuous character, and thus be drawn into the seam by degrees as the welding operation progresses.

The roll of wire-gauze ribbon $b$, for application to a continuous seam, is shown in Figs. 3 and 4 adjacent to the joint of the tube $c$ and tangential skelp $d$, the end of the ribbon $c'$ being inserted in the joint to be welded beneath the point where the hammer $e$ would operate to close the joint. In practice the metal in forming such continuous welded joints is heated by a jet of gas propelled by a powerful blast in the direction of the joint, as indicated by the arrow $f$ in Fig. 4. The use of such a blast renders it very difficult or impossible to apply flux in the form of powder to such joint, while flux in a moist state, as paint or varnish, applied to the surface of the metal adjacent to the joint is not effective, as the heat speedily dries such a coating, and the blows of the hammer are liable to dislodge and remove it.

In the use of my improvement the porous character of the wire-gauze causes it to hold the fluxing material very securely under the blows of the welding-hammer, and retains the flux in the joint to be welded until the flux is flowed upon the heated surfaces in the desired manner. The wire-gauze, when made of iron, presents no obstacle to the formation of a perfect welded joint, but, on the contrary, it acts as a cement and becomes integral with the welded surfaces. This is owing largely to the fact that iron can only be drawn into a fine wire when the iron is of the purest character and best quality, and such iron is therefore perfectly softened by the welding heat and is perfectly amalgamated with the other surfaces where formed of iron or steel. Iron wire-gauze is especially adapted as a vehicle for the welding-flux, and a continuous ribbon of such gauze is especially adapted for the application of the flux to continuous seams, such as are required in the formation of spirally-welded pipe, where a powerful blast is used and where the application of flux by any other means is impossible.

Figs. 4 and 5 show other applications of the flux-carrier to weld joints, Fig. 4 showing in perspective the junction of two flat sheet-metal blanks $g$, with a strip of the flux-carrier $a$ between them, and Fig. 5 showing in perspective the longitudinal joint of a cylindrical shell $h$, with the flux-carrier $a$ interposed.

Many other applications could be readily suggested, but are not necessary to make the application of the invention further understood.

I have claimed broadly herein the use of fine wire net to hold the flux in a joint, and claimed the same, whatever the nature of the metals that are pressed together and united by heat with the aid of the fine wire net. In such claim I have not restricted myself to any particular kind of welding-flux, but have also made a specific claim to the use of iron wire-gauze coated with melted borax, as such combination is especially desirable for uniting iron and steel joints.

Having thus set forth the nature of my invention, what I claim herein is—

1. The combination of the welding-flux with a fibrous material adapted to hold the flux in the joint to be united, substantially as herein set forth.

2. The combination, with the welding-flux, of fine wire net, as and for the purpose set forth.

3. Iron wire-gauze coated with melted borax, as and for the purpose set forth.

4. A continuous ribbon of iron wire-gauze coated with fluxing material, as and for the purpose set forth.

In testimony whereof I have hereunto set my hand in the presence of two subscribing witnesses.

JAMES C. BAYLES.

Witnesses:
LEWIS C. BAYLES,
THOS. S. CRANE.